US011373654B2

(12) United States Patent
Roeck

(10) Patent No.: US 11,373,654 B2
(45) Date of Patent: Jun. 28, 2022

(54) ONLINE AUTOMATIC AUDIO TRANSCRIPTION FOR HEARING AID USERS

(71) Applicant: SONOVA AG, Staefa (CH)

(72) Inventor: Hans-Ueli Roeck, Hombrechtikon (CH)

(73) Assignee: Sonova AG, Staefa (CH)

( * ) Notice: Subject to any disclaimer, the term of this patent is extended or adjusted under 35 U.S.C. 154(b) by 189 days.

(21) Appl. No.: 16/632,962

(22) PCT Filed: Aug. 7, 2017

(86) PCT No.: PCT/EP2017/069912
§ 371 (c)(1),
(2) Date: Jan. 22, 2020

(87) PCT Pub. No.: WO2019/029783
PCT Pub. Date: Feb. 14, 2019

(65) Prior Publication Data
US 2020/0160867 A1 May 21, 2020

(51) Int. Cl.
*G10L 15/26* (2006.01)
*G10L 15/22* (2006.01)
(Continued)

(52) U.S. Cl.
CPC .............. *G10L 15/26* (2013.01); *G10L 15/22* (2013.01); *G10L 15/30* (2013.01); *H04R 25/554* (2013.01); *H04R 2225/55* (2013.01)

(58) Field of Classification Search
CPC ..... A61B 5/0002; A61B 5/6817; G10L 15/22; G10L 15/26; G10L 15/30; G10L 13/00; G10L 21/0364; G16H 10/60; H04M 7/0051; H04M 1/72454; H04M 3/42391; H04R 25/43; H04R 25/554; H04R 25/558; H04R 2225/55; H04R 25/65; G06F 40/42; G06V 40/171; G11B 27/102;
(Continued)

(56) References Cited

U.S. PATENT DOCUMENTS 6,157,727 A    12/2000  Rueda
6,377,925 B1    4/2002  Greene, Jr. et al.
(Continued)

FOREIGN PATENT DOCUMENTS

CN        1214178      4/1999
CN      201365285     12/2009
(Continued)

*Primary Examiner* — Gerald Gauthier
(74) *Attorney, Agent, or Firm* — ALG Intellectual Property, LLC

(57) ABSTRACT

An automatic audio transcription method comprises: sending an audio stream and an identifier of the audio stream from a microphone device to an audio support server and to at least one hearing aid system comprising a hearing aid and a portable device connected to the hearing aid; playing the audio stream with the hearing aid; registering the at least one hearing aid system at the audio support server by sending the identifier from the hearing aid system to the audio support server; transcribing the audio stream into a text stream; sending the text stream from the audio support server to the portable device associated with the identifier of the audio stream; and displaying the text stream with the portable device.

14 Claims, 2 Drawing Sheets

(51) Int. Cl.
*G10L 15/30* (2013.01)
*H04R 25/00* (2006.01)

(58) Field of Classification Search
CPC . H04L 12/1822; H04L 12/2854; H04L 67/02; H04N 21/41407; H04W 48/18
USPC ........ 379/52, 93.15; 704/235, 260; 381/328; 709/203
See application file for complete search history.

(56) References Cited

U.S. PATENT DOCUMENTS

| | | | |
|---|---|---|---|
| 6,618,704 | B2 | 9/2003 | Kanevsky et al. |
| 9,325,828 | B1* | 4/2016 | Oh .................... H04M 1/72454 |
| 9,497,315 | B1* | 11/2016 | Pakidko ............. H04M 3/2281 |
| 9,544,430 | B2* | 1/2017 | Nachtrab .......... H04M 3/42391 |
| 9,571,638 | B1* | 2/2017 | Knighton ................ G10L 15/26 |
| 9,946,842 | B1* | 4/2018 | Stringham ............. G16H 10/60 |
| 2003/0065504 | A1 | 4/2003 | Kraemer et al. |
| 2005/0226398 | A1* | 10/2005 | Bojeun ............... H04L 12/2854 |
| | | | 379/93.15 |
| 2014/0324422 | A1* | 10/2014 | Winarski ......... H04N 21/41407 |
| | | | 704/235 |
| 2015/0112677 | A1* | 4/2015 | Schubert ................ G10L 15/26 |
| | | | 704/235 |
| 2015/0149169 | A1* | 5/2015 | Chang .................... G10L 15/26 |
| | | | 704/235 |
| 2015/0199977 | A1* | 7/2015 | Ungstrup ................ G10L 13/00 |
| | | | 704/260 |
| 2015/0201282 | A1* | 7/2015 | Athalye ................. H04R 25/65 |
| | | | 381/328 |
| 2015/0245087 | A1* | 8/2015 | Winarski ............... H04H 20/18 |
| | | | 381/315 |
| 2015/0255066 | A1* | 9/2015 | Wilder .................... G10L 15/26 |
| | | | 704/235 |
| 2015/0279354 | A1* | 10/2015 | Gruenstein ............. G10L 15/22 |
| | | | 704/235 |
| 2015/0287408 | A1 | 10/2015 | Svendsen et al. |
| 2016/0142538 | A1* | 5/2016 | Bredikhin ......... H04M 3/42391 |
| | | | 379/52 |
| 2016/0164949 | A1* | 6/2016 | Grimstrup ............... H04L 67/02 |
| | | | 709/203 |
| 2016/0179831 | A1* | 6/2016 | Gruber .................... G06F 40/42 |
| | | | 704/235 |
| 2016/0373869 | A1* | 12/2016 | Gran ...................... H04R 25/558 |
| 2016/0379641 | A1* | 12/2016 | Liu ........................ G11B 27/102 |
| | | | 704/235 |
| 2017/0257712 | A1* | 9/2017 | Porsbo .................. H04R 25/558 |
| 2017/0257713 | A1* | 9/2017 | Westermann .......... H04W 48/18 |
| 2018/0108370 | A1* | 4/2018 | Dow ....................... A61B 5/121 |
| 2018/0213339 | A1* | 7/2018 | Shah .................... H04R 25/558 |
| 2018/0365232 | A1* | 12/2018 | Lewis ..................... G06F 40/58 |
| 2018/0375993 | A1* | 12/2018 | Boehme ........... H04M 3/42391 |
| 2020/0034437 | A1* | 1/2020 | Lewis ..................... G10L 15/26 |
| 2020/0160867 | A1* | 5/2020 | Roeck .................... G10L 15/22 |
| 2021/0119817 | A1* | 4/2021 | DeLapa ................ H04L 12/1822 |
| 2021/0289298 | A1* | 9/2021 | Roeck .................. A61B 5/6817 |

FOREIGN PATENT DOCUMENTS

| | | |
|---|---|---|
| CN | 106205292 | 12/2016 |
| WO | 2014094858 | 6/2014 |

* cited by examiner

ONLINE AUTOMATIC AUDIO TRANSCRIPTION FOR HEARING AID USERS

FIELD OF THE INVENTION

The invention relates to a method, a computer program and a computer-readable medium for automatic audio transcription. Furthermore, the invention relates to an audio transcription system.

BACKGROUND OF THE INVENTION

Automatic audio transcription services provide the opportunity to transcribe an audio stream with spoken language into a text stream of the same text content. Such services may be provided via a web service API or directly with an application for a smartphone. The application is usually provided for personal use, whereas the web service API as a base service is mainly provided for commercial users, which want to develop further services upon the base services for end users.

For users of hearing aids, an automatic transcription service is interesting, since they receive the possibility to read a simultaneous transcription of that what a person in their vicinity is saying. For example, a hearing aid wearer listening to a lecture or presentation also may read the transcription with his smartphone.

Since many hearing aids nowadays have interfaces, such as Bluetooth©, for communication with smartphones and also smartphone application for interaction with the hearing aid are developed, this opens the possibility for a better integration of transcription services into a hearing aid environment.

US 2015/0287408 A1 describes a method providing speech recognition to a user on a mobile device. The method comprises receiving, by a processor, audio data, and processing the audio data, by a speech recognition engine, to determine a corresponding text.

DESCRIPTION OF THE INVENTION

It is an objective of the invention to facilitate the usage of automatic online audio transcription services for hearing aid users. It is a further objective of the invention to reduce the demands on a distributed audio transcription service interaction with a plurality of hearing aids.

These objectives are achieved by the subject-matter of the independent claims. Further exemplary embodiments are evident from the dependent claims and the following description.

An aspect of the invention relates to an automatic audio transcription method. The method may be performed by a distributed system that comprises a server, which generates a text stream from an audio stream, which was sent by a microphone device. Further, the audio stream and the text stream are played and displayed by a hearing aid system. It has to be understood, that the server may be remote from the microphone device and the hearing aid system. On the other hand, the microphone device in the hearing aid system may be near each other and/or may be carried by persons, which are at the distance, such that they can hear each other. The term "remote" may relate to distances that may be higher than 1 km. The term "near" may relate to distances smaller than 100 m. For example, the server may be provided by a cloud computing facility that may be even provided on a different continent, while the microphone device and the hearing aid system may be situated in the same room.

Automatic audio transcription may relate to transcribing spoken words, which may be provided in the form of an audio stream, into readable text of the same content, which may be provided as a text stream. An audio stream may be digitized data that was recorded by a microphone device. The text stream may be digitized data that comprises characters representing the text.

According to an embodiment of the invention, the method comprises: sending an audio stream and an identifier of the audio stream from a microphone device to an audio support server and to at least one hearing aid system comprising a hearing aid and a portable device connected to the hearing aid; playing the audio stream with the hearing aid; registering the at least one hearing aid system at the audio support server by sending the identifier from the hearing aid system to the audio support server; transcribing the audio stream into a text stream; sending the text stream from the audio support server to the portable device associated with the identifier of the audio stream; and displaying the text stream with the portable device.

In summary, the audio stream is sent from the microphone device to the server, which transforms it into a text stream and which sends the text stream to the hearing aid system. The identifier, which may be important for associating the transcribed text stream with the audio stream and for associating the microphone device with the audio stream is generally sent via two different channels to the server, i.e. directly from the microphone device to the server and indirectly from the microphone device via the hearing aid system to the server. The registration of the hearing aid system at the server may be performed automatically, after the identifier is received in the hearing aid system. In such a way, it is not necessary that the hearing aid system has to be registered manually at the server for receiving the text stream.

The identifier of the audio stream may be generated by the microphone device automatically, when a new audio stream is generated. For example, this may be the case, when the microphone device is switched on, gets unmuted and/or when a corresponding command is executed with the microphone device. The identifier may be a digital code, for example a number or a combination of characters and digits.

The microphone device may be a portable device that may be ported by a person which is giving a lecture or making a presentation. It may also be another hearing aid, earbud or other ear level worn device containing a microphone. It may be an audio gathering device connected to e.g. a TV and transmitting the TV audio signal wirelessly to the hearing aid system. The microphone device may have an interface to the server, for example via a wireless radio connection and/or Bluetooth©. Furthermore, the microphone device may have an interface to the hearing aid system, which may be different from the interface to the server. For example, this interface may be at second wireless radio connection different from the wireless radio connection to the server.

The hearing aid system may comprise a hearing aid and further portable device. A hearing aid may be a device, which is adapted for being carried by a user at least partially in or on the ear. In addition, a hearing aid also may be a Cochlear implant device, with parts implanted inside the head. The hearing aid may or may not compensate for hearing loss of a wearer, for example also may be a hearable or wireless earphone. The hearing aid may have an interface to the microphone device, such as the above mentioned second wireless radio connection and may have a further interface to the further portable device, which may be the same type of interface as between the microphone device and the server, such as Bluetooth ©.

The further portable device may be a smartphone or a tablet computer and/or may have an interface for communication with the hearing aid and the server. This interface may be based on Bluetooth©. The further portable device may comprise a display that is adapted for displaying the text stream. On the other hand, the microphone device and/or the hearing aid may not have a display.

According to an embodiment of the invention, the audio stream and the identifier are sent to the hearing aid. A digital data communication may be established between the microphone device and a hearing aid based on a protocol adapted for transferring the audio stream in such a way, that a time delay between the recording of the audio stream and the playing of the audio stream in the hearing aid is smaller than 40 ms in order to be faster or at least not significantly slower than the acoustic delay of the audio source to the hearing aid wearer, and/or which is tailored such that the hearing aid uses a minimal amount of power during good reception conditions while still providing a robustness against interferers. For example, the "Phonak Roger" © devices utilize such a protocol. This digital data communication also may be used for transferring the identifier from the microphone device to the hearing aid system.

According to an embodiment of the invention, the audio stream and/or the identifier are sent to the further portable device. The audio stream is forwarded to the hearing aid while the identifier is forwarded to the server. The audio stream might also be forwarded to the server. I.e. the transport path from the microphone device to the audio support server is using the further portable devices. An audio support server detecting multiple audio streams from different portable devices, but all with the same identifier, discards all but one audio streams. The remaining audio stream gets transcribed. The transcribed text stream is then sent from the audio support server to all portable devices with the corresponding identifier.

According to an embodiment of the invention, the identifier is sent from the hearing aid to the portable device. The registration of the hearing aid system at the audio support server may be performed by the portable device. Therefore, the identifier which has been received by the hearing aid may be provided to the portable device via the communication connection between the hearing aid and the portable device that, for example, may be based on Bluetooth©. The identifier may be sent via Bluetooth© from the hearing aid to the portable device.

According to an embodiment of the invention, the audio stream and the identifier are sent via a wireless digital radio communication directly from the microphone device to the hearing aid. As already mentioned, a specific communication connection may be established between the microphone device and the hearing aid that is especially suited for transferring an audio stream containing spoken language. It may be possible that the wireless digital radio communication between the microphone device and the hearing aid is automatically established, when the hearing aid detects that the microphone device is in the communication range of the hearing aid. The communication range may be defined with respect to the wireless digital radio complication. For example, the hearing aid may scan its environment with the associated interface and may register at the microphone device with the highest signal strength and/or switch to a received such audio signal from a broadcasted radio signal by the microphone device.

It also may be that the audio stream and the identifier are sent directly from the microphone device to the portable device of the hearing aid system and/or to a further portable device. In this case, the audio stream may be sent from the portable device of the hearing aid system to the hearing aid, for example via the Bluetooth© connection.

According to an embodiment of the invention, the audio stream and the identifier from the microphone device are sent to the audio support server via the portable device. In general, the audio stream may not be sent directly from the microphone device to the audio support server but via one or more portable devices. Not a separate data connection may be used as a path from the microphone device to the audio support server, but one or multiple portable devices. The portable device(s) then may forward the audio stream to the associated hearing aid(s) while the identifier is forwarded to the audio support server.

According to an embodiment of the invention, the audio support server receives the audio stream from at least two portable devices and/or the audio stream is transcribed into the text stream solely one time. The audio support server may receive one or multiple audio streams, which however may be associated with the same identifiers. The audio support server may filter out audio streams with the same identifier and may forward only one to a transcription server. All but one audio streams with the same associated identifier may be discarded by the audio support server and only one such audio stream may be transcribed.

According to an embodiment of the invention, the audio stream and the identifier are sent via an Internet connection to the audio support server. The audio support server may be remote from the microphone device. A local network that provides e.g. the Bluetooth© or Wi-Fi connection, which is a part of the communication connection between the microphone device and the audio support server, may be connected with the global Internet.

According to an embodiment of the invention, the identifier is sent via an Internet connection from the portable device to the audio support server. The portable device, which is part of the hearing aid system, may be connected with the same local network that provides the e.g. Bluetooth© or Wi-Fi connection. For example, the local network may be provided by a building, in which the persons porting the microphone device and the hearing aid system are situated.

According to an embodiment of the invention, the audio stream is sent via an Internet connection from the portable device to the audio support server. In the case, when the audio stream is sent via one or more portable devices to the audio support server, this may be performed via the Internet connection, which is also used for sending the identifier.

According to an embodiment of the invention, the text stream is sent via an Internet connection from the audio support server to the portable device. The text stream for the portable device may be sent via the same communication connection between the audio support server and the portable device that was also used for transferring the identifier.

According to an embodiment of the invention, the audio stream is sent from the audio support server to a text transcription server, which transcribes the audio stream into the text stream and sends the text stream back to the audio support server. It may be, that the audio support server is only responsible for handling the association of audio streams and text streams between microphone devices and hearing aid systems. The audio support server may use a further server, i.e. the text transcription server, for transcribing the audio stream. The text transcription server may be called by the audio support server with a web service API and/or the text transcription server may be provided by a different company as the one which provides the audio support server, which different company provides the automatic text transcription as a service.

However, it is also possible that the text transcription is also provided by the audio support server. In general, it has to be noted, that the servers mentioned herein may be virtual servers that are provided by the same hardware or by different hardware. However, the hardware for the audio support server and or the text transcription server may be remote from the microphone device and the hearing aid system.

According to an embodiment of the invention, the audio stream and the identifier are sent to a plurality of hearing aid systems, which are registering at the audio support server with the identifier and which receive the transcribed text stream. In such a way, the audio stream may be transcribed only one time for a plurality of hearing aid systems. The audio support server may transcribe or may advice the transcription server to transcribe the one audio stream into one text stream, which is then distributed by the audio support server to the plurality of hearing aid systems. This may have the advantage, that the computational load on the transcription server may be lowered. Additionally, when the transcription is provided as service, service fees may be lowered, since the transcription of the same audio stream for multiple hearing system users may be avoided.

According to an embodiment of the invention, the method further comprises: translating the text stream into another language. Additionally, the text stream, which may be present in a first language, may be automatically translated into another language. This may be performed by the audio support server, the transcription server and/or a third server, which may be a translation server. It may be that every hearing aid system registers at the audio support server with a specific language and the audio support server sends a translated text stream with the demanded language to the specific hearing aid system. Again, a multiple translation of the same text stream into the same language may be avoided.

According to an embodiment of the invention, the method further comprises: registering a portable device at the audio support server by inputting the identifier into the portable device and sending the identifier to the audio support server; and sending the text stream from the audio support server to the portable device associated with the identifier of the audio stream. It is also possible that persons, which do not use a hearing aid system but which have a portable device such as a smartphone or a tablet computer, also register at the audio support server and also receive the text stream. The identifier may be input manually into the portable device. For example, the identifier of the microphone device may be provided with a computer-readable code, such as a barcode or QR code, which may be scanned by the portable device (which is not connected with a hearing aid). It also may be possible that near field communication is used in the vicinity of the microphone device for inputting the identifier into the portable device.

According to an embodiment of the invention, the identifier is generated by the microphone device. As already mentioned, the identifier may be associated with an audio stream generated by the microphone device. Also, the identifier may be unique with respect to the audio support server. The identifier may be unique in the sense that every audio stream received by the audio support server from a different microphone device and/or a different session is identified by a different identifier. A session is meant as the duration of a presentation, a talk, a class in school etc.

A further aspect of the invention relates to a computer program, or more general to a collection of computer programs, for automatic audio transcription, which, when being executed by a microphone device, an audio support server and at least one hearing aid system, is/are adapted to carry out the steps of the method as described in the above and in the following. A further aspect of the invention relates to a computer-readable medium, in which such a computer program is stored. For example, the computer program may comprise functions executed in the audio support server, functions executed in the microphone device, functions executed in the hearing aid and functions executed in a portable device.

A computer-readable medium may be a hard disk, a USB (Universal Serial Bus) storage device, a RAM (Random Access Memory), a ROM (Read Only Memory), an EPROM (Erasable Programmable Read Only Memory) or a FLASH memory. A computer-readable medium may also be or involve a data communication network, e.g. the Internet, which allows downloading a program code. In general, the computer-readable medium may be a non-transitory or transitory medium.

A further aspect of the invention relates to an audio transcription system, which comprises a microphone device, an audio support server and at least one hearing aid system.

According to an embodiment of the invention, the audio support server is adapted for transcribing an audio stream into a text stream. Alternatively, the audio support server is adapted for sending the audio stream to an audio transcription server and for receiving the transcribed text stream from the audio transcription server.

According to an embodiment of the invention, a hearing aid system comprises a hearing aid for playing the audio stream and a portable device adapted for displaying the text stream. The audio stream may be played by the same loudspeaker, which is also used for playing the sound that was directly recorded by the hearing aid and amplified according to the needs of the hearing aid wearer. The portable device has a display for displaying the text stream. The hearing aid, which is a different device as the portable device, usually does not have a display.

According to an embodiment of the invention, the audio transcription system is adapted for performing the method as described in the above and in the following. The microphone device is adapted for sending an audio stream and an identifier of the audio stream to the audio support server and the at least one hearing aid system. The hearing aid system is adapted for registering at the audio support server by sending the identifier to the audio support server. The audio support server is adapted for sending the text stream to the at least one hearing aid system.

It has to be understood that features of the method as described in the above and in the following may be features of the computer program, the computer-readable medium and the audio transcription system as described in the above and in the following, and vice versa.

These and other aspects of the invention will be apparent from and elucidated with reference to the embodiments described hereinafter.

BRIEF DESCRIPTION OF THE DRAWINGS

Below, embodiments of the present invention are described in more detail with reference to the attached drawings.

The reference symbols used in the drawings, and their meanings, are listed in summary form in the list of reference symbols. In principle, identical parts are provided with the same reference symbols in the figures.

DETAILED DESCRIPTION OF EXEMPLARY EMBODIMENTS

Figure 1:
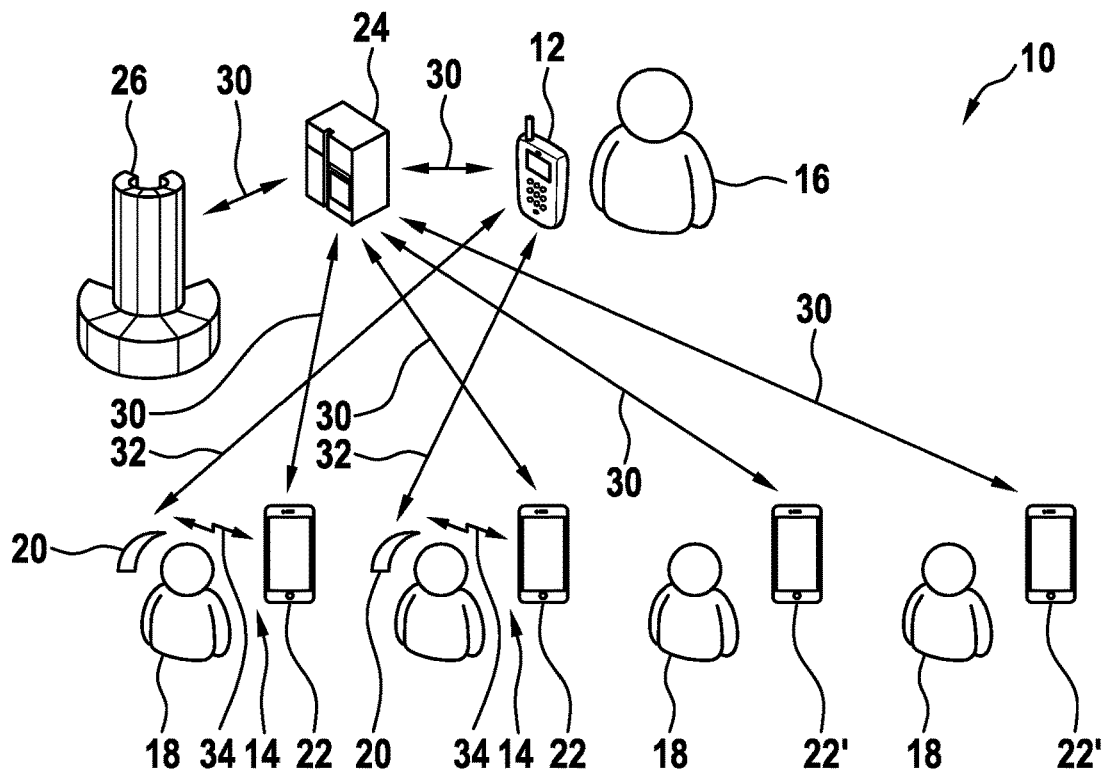
FIG. 1 schematically shows an audio transcription system according to an embodiment of the invention.

FIG. 1 shows an automatic audio transcription system 10 comprising a microphone device 12 and a plurality of hearing aid systems 14. The microphone device 12 may be ported by a talker 16, such as a teacher, a guide, a host, etc. Every hearing aid system 14 may be worn by a listener 18, such as a pupil, audience member, etc.

A hearing aid system 14 comprises a hearing aid 20 that is usually worn in or near the ear of the listener 18, and a portable device 22, such as a smartphone, tablet computer, laptop, etc.

It also may be that further portable devices 22', not being a member of a hearing aid system, which are used by further listeners 18, are part of the audio transcription system 10.

The parts of the audio transcription system 10 described up to now all may be located near each other, i.e. nearer as 100 m and/or in the same room. Usually, the persons 16, 18 all will be within a range that they would be able to talk to each other.

Other parts of the audio transcription system 10 may be an audio support server 24 and an optional audio transcription and/or translation server 26, which may be remoter from the parts of the system 10 mentioned above. For example, the servers 24, 26 may be located in a different building or different buildings, for example in different cloud computing facilities. The audio support server 24 and an optional audio transcription and/or translation server 26 may be connected with an Internet connection 30.

The microphone device 12 and the audio support server 24 may be connected with an Internet connection 30, which may be locally provided via a wireless communication connection such as Bluetooth© and/or Wi-Fi. Also the portable devices 22, 22' may be connected with the audio support server 24 via an Internet connection, which may be locally provided via a wireless communication connection such as Bluetooth© and/or Wi-Fi.

The microphone device 12 and the hearing aids 20 may be connected with a wireless communication connection 32 of a second type that is adapted for transferring audio data as fast that a hearing aid wearer does not feel a delay between watching the speaker and hearing him.

Within each hearing system 14, the hearing aid and the portable device may communicate via a further wireless communication connection 34, which also may be provided with Bluetooth©.

Figure 2:
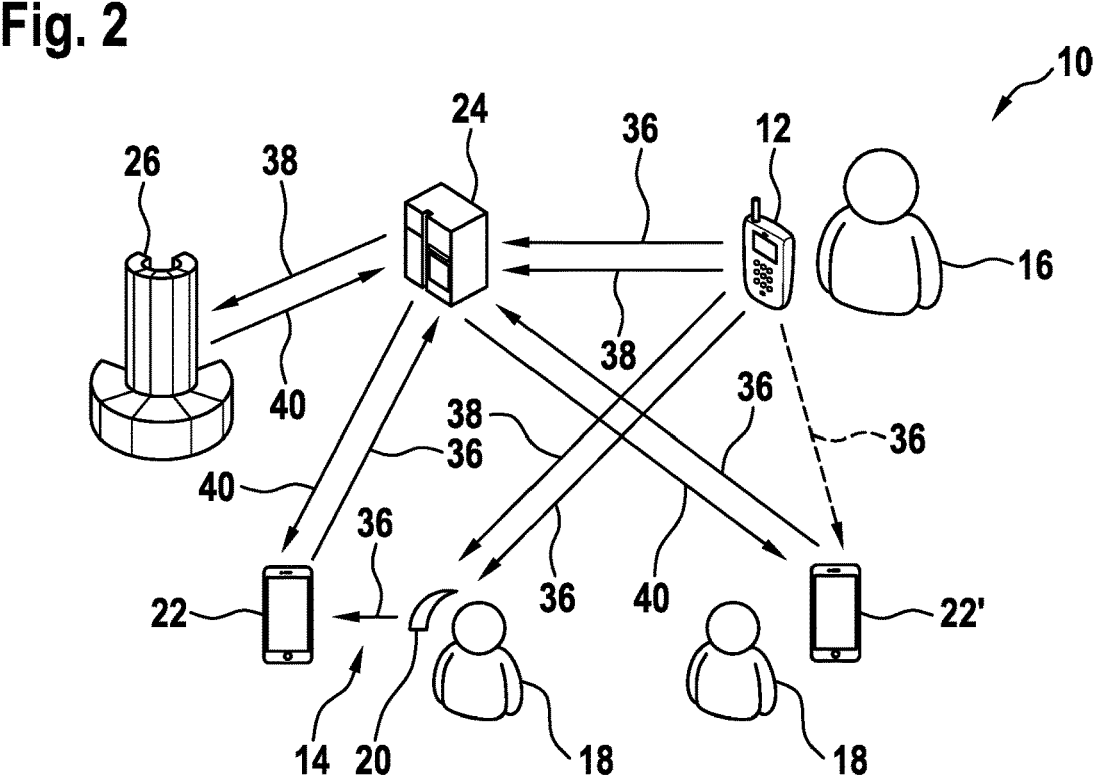
FIG. 2 illustrates an automatic audio transcription method according to an embodiment of the invention.

FIG. 2 illustrates an automatic audio transcription method, which may be performed with the system 10 shown in FIG. 1.

In general, the system 10 allows to provide an automatic transcription and optionally an automatic translation of the speech of the talker 16 for a plurality of listeners 18. In particular, an audio stream 38 and an identifier 36 for the audio stream is generated by the microphone device and transcribed and optionally translated into a text stream 40, which is then displayed by the portable devices 22, 22'.

During the method, the microphone device 12 generates an audio stream 38 from the speech of the talker 16. The talker 16 may speak into a loudspeaker of the microphone device, which may digitize the recorded sound into the audio stream 38. Since the microphone device 12 may be worn by the talker 16 or at least may be situated nearer to the talker 16 as the hearing aid wearers 18, the audio stream may have a better sound-to-noise ratio as the audio data that may be gathered by a microphone of a hearing aid 20.

Additionally, the microphone device 12 may generate an identifier 36 of the audio stream 38. This identifier 36 will be used in the system 10 for associating the hearing aid systems 14 with the correct text stream 40. The identifier 36 may be unique with respect to the audio stream 38. The identifier 36 may be generated randomly with a suitable seed value, for example in dependence of the serial number of the microphone device 12, the time of day, etc.

The audio stream 38 and the identifier 36 of the audio stream 38 are then sent from the microphone device 12 to the hearing aid systems 14. It may be that the hearing aid systems 14 have themselves registered at the microphone device 12. It also may be that the microphone device 12 broadcasts the audio stream 36 and the identifier via its interface for the communication connection 32 and every hearing aid system 14 in a suitable range of the microphone device 12 may receive the data 36, 38.

The audio stream 38 and the identifier 36 may be sent to the hearing aid 20 via the wireless digital radio communication connection 32 directly from the microphone device 12 to the hearing aid 20. The hearing aid 20 may play the audio stream 38, which usually has a better quality as the audio data generated within the hearing aid 20 with its internal microphone.

And the hearing aid 20 may send the identifier via the communication connection 34 to the portable device 22. In the portable device 22, a hearing aid application may be running, which may be used for controlling the hearing aid 20. Such an application also may be used for further processing the identifier 36.

The audio stream 38 and the identifier 36 are also sent by the microphone device 12 to the audio support server 24 via the Internet connection 30, for example via Bluetooth© and/or Wi-Fi to a router and from there via wire bound communication lines to the server 24.

Each hearing aid system 14 is now able to register at the audio support server 24 with the identifier 36 of the audio stream 38. The identifier 36 may be sent from the portable device 22 to the audio support server 24 also via the Internet connection 30, for example firstly via Bluetooth© and/or Wi-Fi to a router and from there via wire bound connections to the server 24. The audio support server 24 may generate a list of listening hearing systems 14, which are associated with the audio stream 36.

For example, the above mentioned control application running in the portable device 22 may connect to the audio support server 24 and may request a text stream 40 of the audio stream 38 with the respective identifier authentication. Optionally, the portable device 22, and in particular the application, may send a desired target language to the audio support server 24. Also this language may be saved for the respective hearing system 14 in the list of listening hearing systems 14.

After receiving the audio stream 38 and when at least one hearing aid system 14 has registered at the audio support server 24, the audio support server 24 controls a transcription of the audio stream 38 into a text stream 40. To this end, the audio support server 24 may forward the audio stream 38 to the transcription/translation server 26, which may provide a transcription/translation service. The audio stream 38 may be sent from the audio support server 24 to the text transcription/translation server 26 via the Internet connection 30. The server 26 then transcribes the audio stream 38 into the text stream 40 and sends the text stream 40 back to the audio support server 24.

It also may be that the text stream 40 is translated into one or more target languages. The server 24 may collect all translation requests and target languages from the portable devices 22, 22' and may demand only one translation per language. For that purpose, the server 24 may send the audio stream 38 to the transcription/translation server 26 once and may request directly a translation into the one or more target languages.

Alternatively, the server 24 also may request only the transcription in the original language from the server 26. With the transcription, it could then access the same or a further translation server 26 to get one or more translated text streams 40.

Since only one transcribed text stream in the original language and/or at least one text stream 40 per demanded target language is generated by the server 26, the system 10 scales easily with more hearing aid systems 14.

The audio support server 23 then distributes the transcript/translation to the hearing aid systems 14. The transcribed and optionally respective translated text stream 40 may be sent via the Internet connection 30 from the audio support server 24 to the portable device 22 associated with the identifier 36 of the audio stream 36.

In the end, the text stream 40 may be displayed by the portable device 22. Without any user interaction to register to the correct source, a listener 18 may get the correct transcript/translation from the talk of the talker 16. It also may be that the transcribed and optionally translated text stream 40 is transformed back into an audible audio stream, for example by a text-to-speech (TTS) synthesizer. This may be performed locally in the portable device 22. Likewise, the further translation server may be located within the portable device 22. Thus, the audio support server 24 may send the transcribed text back to the portable device 22, which either shows the transcribed text to the user and/or translates it first and/or transforms it back to an audible audio signal.

Potentially, the portable device 22 may adapt the transcription and/or translation locally, for example given meta-information about the probability of correct transcription and/or translation or alternative words as provided by the transcription server and a local database with terms and expressions as used by the wearer and people in his/her social network.

It also may be that a listener 18 (possibly without a hearing aid 20) may manually register a further portable device 22' at the audio support server 24 by inputting the identifier 36 or a representation thereof into the portable device 22' and sending the identifier 36 to the audio support server 24. For example, a listener 18 using a hearing aid 20 without direct connection to the microphone device 12 may register manually in this way. The identifier 36 may be manually entered as an alphanumerical code. Also, the identifier 36 may be manually input by scanning a QR-code or by NFC (near field communication), i.e. by holding the portable device shortly into the vicinity of the microphone device.

Also this portable device 22' and optionally a target language may be listed in the server 24, which may then send the text stream 40 to the further portable device 22' associated in such a way with the identifier 36.

Additionally, encryption methods may be used between the microphone device and the audio support server 24, between the audio support server 24 and the transcription/translation server 26, and/or the audio support server 24 and the portable devices 22, and/or the microphone device 12 and the hearing aids 20, and/or the hearing aids 20 and the portable device 22. In particular, the identifier 36 as well as the audio stream 38 and/or the transcribed/translated text 40 may be sent between the microphone device 12 and/or between a portable device 22, 22' and the server 24 in an encrypted way.

Figure 3:
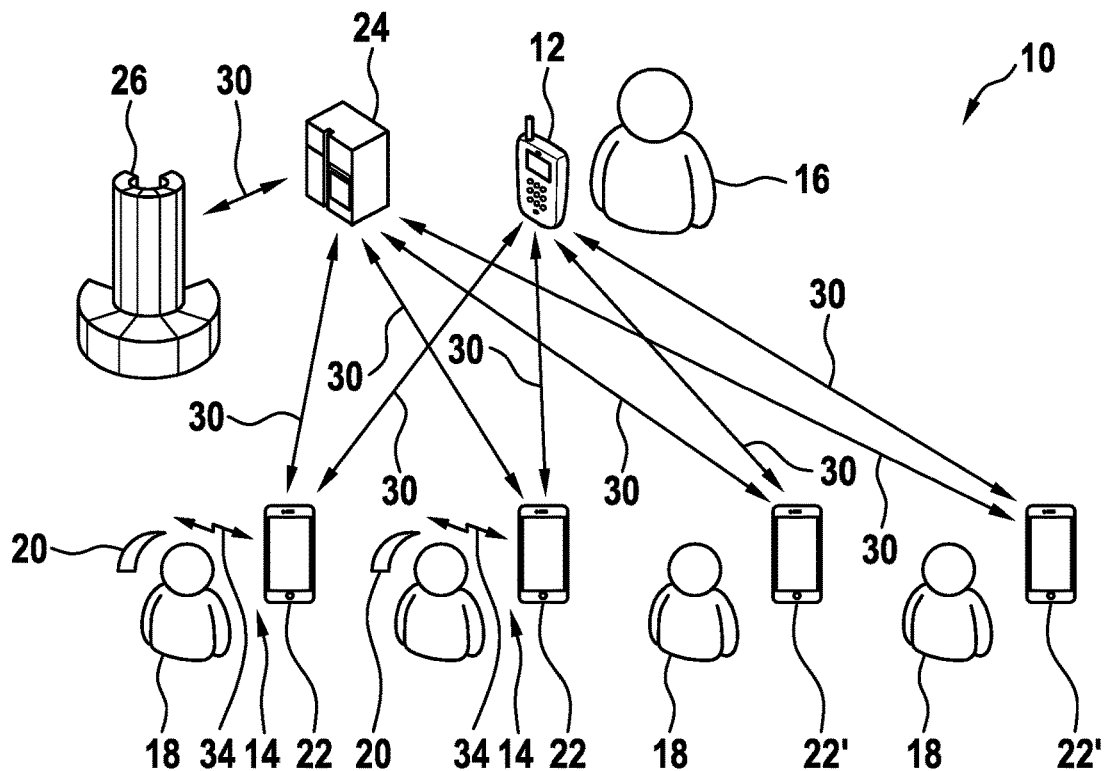
FIG. 3 schematically shows an audio transcription system according to a further embodiment of the invention.

FIG. 3 shows an automatic audio transcription system 10, which differs from the one shown in FIG. 1 in that the microphone device 12 is not directly connected to the audio support server 24 and in that the microphone device 12 is connected with the portable devices 22, 22' via an Internet connection 30. The remaining components of the system 10 of FIG. 3 may be the same as described with respect to FIG. 1.

Figure 4:
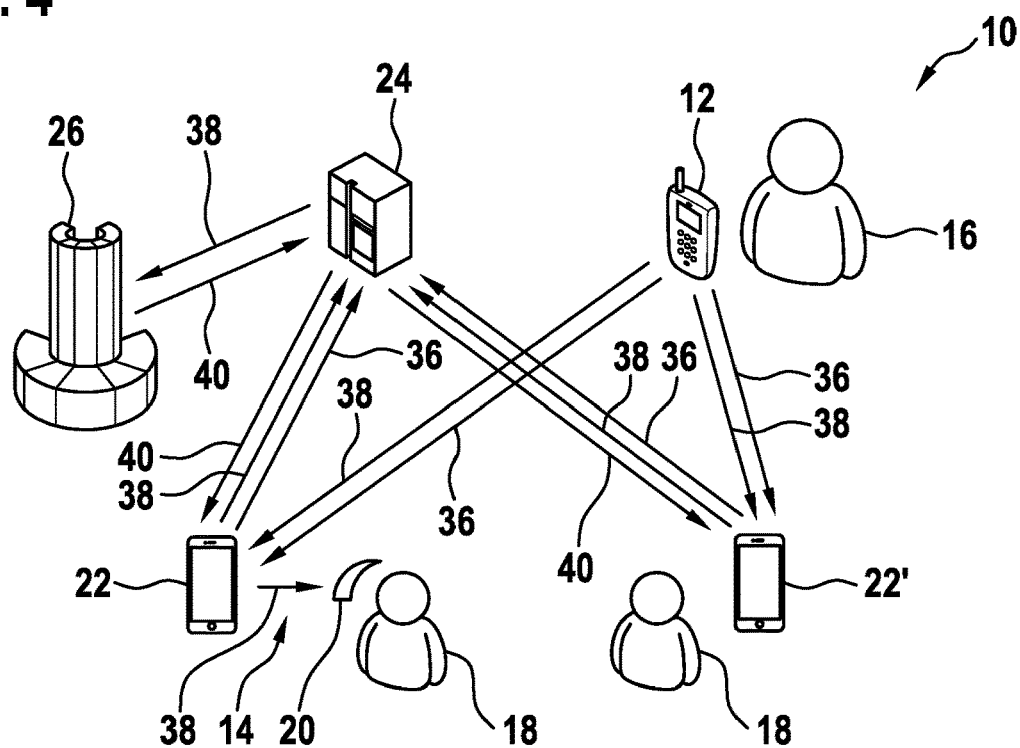
FIG. 4 illustrates an automatic audio transcription method according to a further embodiment of the invention.

As shown in FIG. 4, with the system 10 of FIG. 3, the audio stream 38 and the identifier 36 may be sent from the microphone device 12 to the portable devices 22, 22'. The audio stream 38 and the identifier 36 then may be sent to the audio support server 24 by the portable devices 22, 22'. The portable device 22 also may send the audio stream 38 to the hearing aid 20.

In the case, the audio support server 24 receives more than one audio stream 38 from at least two portable devices 22, 22', which are associated with the same identifier 26, the audio support server 24 may discard all but one audio streams 38. Only one audio stream 38 may be sent to the transcription/translation server 26 and may be transcribed and optionally translated solely one time.

The other steps of the method illustrated in FIG. 4 may be the same as the one described with respect to FIG. 2.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

LIST OF REFERENCE SYMBOLS 10 automatic audio transcription system
12 microphone device
14 hearing aid system
16 talker
18 listener
20 hearing aid
22, 22' portable device
24 audio support server 26 audio transcription and/or translation server
30 Internet connection
32 first type wireless communication connection
34 second type wireless communication connection
36 identifier
38 audio stream
40 text stream

The invention claimed is:

1. An automatic audio transcription method, comprising:
sending an audio stream and an identifier of the audio stream from a microphone device to an audio support server and to a hearing aid included in a hearing aid system, the hearing aid system further including a portable device connected to the hearing aid;
playing the audio stream with the hearing aid;
registering the hearing aid system at the audio support server by sending the identifier from the hearing aid to the audio support server;
transcribing the audio stream into a text stream;
sending the text stream from the audio support server to the portable device associated with the identifier of the audio stream;
displaying the text stream with the portable device.

2. The method of claim 1,
wherein the identifier is sent from the hearing aid to the portable device.

3. The method of claim 1,
wherein the audio stream and the identifier are sent via a wireless digital radio communication connection directly from the microphone device to the hearing aid.

4. The method of claim 1,
wherein the identifier is sent via Bluetooth from the hearing aid to the portable device.

5. The method of claim 1,
where the audio stream and the identifier from the microphone device are sent to the audio support server via the portable device.

6. The method of claim 5,
wherein the audio support server receives the audio stream from at least two portable devices and the audio stream is transcribed into the text stream solely one time.

7. The method of claim 1,
wherein the audio stream and the identifier are sent via an Internet connection to the audio support server; and/or
wherein the audio stream is sent via an Internet connection from the portable device to the audio support server; and/or
wherein the identifier is sent via an Internet connection from the portable device to the audio support server; and/or
wherein the text stream is sent via an Internet connection from the audio support server to the portable device.

8. The method of claim 1,
wherein the audio stream is sent from the audio support server to a text transcription server, which transcribes the audio stream into the text stream and sends the text stream back to the audio support server.

9. The method of claim 1, further comprising:
translating the text stream into another language.

10. The method of claim 1,
wherein the audio stream and the identifier are sent to a plurality of hearing aid systems, which are registering at the audio support server with the identifier and which receive the text stream.

11. The method of claim 1, further comprising:
registering a further portable device at the audio support server by inputting the identifier into the portable device and sending the identifier to the audio support server;
sending the text stream from the audio support server to the further portable device associated with the identifier of the audio stream.

12. The method of claim 1,
wherein the identifier is generated by the microphone device.

13. An audio transcription system, comprising:
a microphone device,
an audio support server adapted for at least one of transcribing an audio stream into a text stream and receiving a transcribed text stream from an audio transcription server;
a hearing aid system comprising a hearing aid for playing the audio stream and a portable device adapted for displaying the text stream;
wherein the microphone device is adapted for sending the audio stream and an identifier of the audio stream to the audio support server and the hearing aid;
wherein the hearing aid is adapted for registering at the audio support server by sending the identifier to the audio support server;
wherein the audio support server is adapted for sending the text stream to the portable device.

14. A non-transitory computer-readable medium storing a computer program that, when executed, direct a processor to:
send an audio stream and an identifier of the audio stream from a microphone device to an audio support server and to a hearing aid included in a hearing aid system, the hearing aid system further including a portable device connected to the hearing aid;
play the audio stream with the hearing aid;
register the hearing aid system at the audio support server by sending the identifier from the hearing aid to the audio support server;
transcribe the audio stream into a text stream;
send the text stream from the audio support server to the portable device associated with the identifier of the audio stream; and
display the text stream with the portable device.

* * * * *